United States Patent
Navarro

(10) Patent No.: US 9,431,851 B2
(45) Date of Patent: Aug. 30, 2016

(54) UPS SYSTEMS AND METHODS USING CURRENT-CONTROLLING LOW-LOSS MODES

(71) Applicant: Eaton Corporation, Cleveland, OH (US)

(72) Inventor: George Arthur Navarro, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 422 days.

(21) Appl. No.: 13/968,953

(22) Filed: Aug. 16, 2013

(65) Prior Publication Data

US 2015/0048691 A1   Feb. 19, 2015

(51) Int. Cl.
  H02J 3/00   (2006.01)
  H02J 9/06   (2006.01)
  H02M 5/458  (2006.01)
  H02M 7/162  (2006.01)

(52) U.S. Cl.
  CPC .......... *H02J 9/061* (2013.01); *H02J 9/062* (2013.01); *H02M 5/4585* (2013.01); *H02M 7/162* (2013.01); *Y10T 307/74* (2015.04); *Y10T 307/747* (2015.04)

(58) Field of Classification Search
  CPC ............................................. H02J 3/00
  USPC ................................................. 307/66
  See application file for complete search history.

(56) References Cited

U.S. PATENT DOCUMENTS

| | | | |
|---|---|---|---|
| 6,191,500 | B1 | 2/2001 | Toy |
| 6,266,260 | B1 | 7/2001 | Zahrte et al. |
| 6,483,730 | B2 | 11/2002 | Johnson, Jr. |
| 7,126,409 | B2 | 10/2006 | Nielsen |

(Continued)

FOREIGN PATENT DOCUMENTS

| | | |
|---|---|---|
| CN | 201234162 Y | 5/2009 |
| CN | 101814753 A | 8/2010 |

(Continued)

OTHER PUBLICATIONS

International Search Report and Written Opinion Corresponding to International Application No. PCT/US2014/050989; Date of Mailing: Oct. 30, 2014.

(Continued)

*Primary Examiner* — Robert Deberadinis
(74) *Attorney, Agent, or Firm* — Myers Bigel & Sibley, P.A.

(57) ABSTRACT

Some embodiments provide a UPS including a non-current-commutated solid-state bypass switch. The bypass switch may include at least one transistor configured to control current to the load. Further embodiments provide a UPS including a converter including a first half-bridge circuit having an input port configured to be coupled to an AC source and an output port coupled to first and second buses and a second half-bridge circuit having an output port configured to be coupled to a load and an input port coupled to the first and second buses. The UPS further includes a control circuit configured to control the converter to provide a first mode wherein the first bridge circuit and the second bridge circuit operate as a rectifier and an inverter, respectively, and a second mode wherein the first and second bridge circuits operate as a pass-through switch from the AC source to the load.

20 Claims, 5 Drawing Sheets

(56) References Cited

U.S. PATENT DOCUMENTS

| | | |
|---|---|---|
| 7,560,831 B2 | 7/2009 | Whitted et al. |
| 7,760,516 B2 | 7/2010 | Johnson, Jr. et al. |
| 7,886,173 B2 | 2/2011 | Krieger et al. |
| 8,344,546 B2 | 1/2013 | Sarti |
| 2005/0201127 A1 | 9/2005 | Tracy et al. |
| 2006/0138867 A1 | 6/2006 | Tian et al. |
| 2008/0252144 A1* | 10/2008 | Wang ............... H02J 9/062 307/66 |
| 2009/0072623 A1 | 3/2009 | Liao |
| 2009/0160255 A1 | 6/2009 | Grady |
| 2011/0013438 A1 | 1/2011 | Frisch et al. |

FOREIGN PATENT DOCUMENTS

| | | |
|---|---|---|
| CN | 102035251 A | 4/2011 |
| CN | 201918789 U | 8/2011 |
| CN | 201928047 U | 8/2011 |
| CN | 102624019 A | 8/2012 |
| EP | 0535289 B1 | 1/1996 |
| EP | 2304633 A2 | 4/2011 |
| EP | 2038782 B1 | 12/2011 |
| EP | 2569846 A2 | 3/2013 |
| JP | 3 624568 B2 | 3/2005 |
| JP | 4328741 B2 | 9/2009 |

OTHER PUBLICATIONS

International Preliminary Report on Patentability Corresponding to International Application No. PCT/US2014/050989; Date of Mailing: Feb. 25, 2016; 12 Pages.

* cited by examiner

UPS SYSTEMS AND METHODS USING CURRENT-CONTROLLING LOW-LOSS MODES

BACKGROUND

The inventive subject matter relates to power conversion apparatus and methods and, more particularly, to uninterruptible power supply (UPS) apparatus and methods.

UPS systems are commonly used in installations such as data centers, medical centers and industrial facilities. UPS systems may be used in such installations to provide backup power to maintain operation in event of failure of the primary utility supply.

Large data centers have proliferated with the advent of web services and cloud computing. Some newer large data centers occupy millions of square feet and house hundreds of thousands of servers. Typically powered by the local grid, these centers may include backup power supply systems including UPSs and diesel-electric backup generators to support continued operation when utility power is lost. Energy consumption is a major concern for such facilities, as some facilities are approaching the 100 MW level. For such facilities, even a few percentage points of efficiency can translate into significant expense.

Techniques for improving UPS efficiency have been developed. For example, some double-conversion UPS systems support high-efficiency or "eco" modes in which the rectifier and inverter are bypassed when the input AC source meets certain criteria. Other solutions to increase data center energy efficiency, such as those described, for example, in U.S. Pat. No. 7,886,173 to Krieger et al., U.S. Pat. No. 7,560,831 to Whitted et al. and U.S. Pat. No. 8,344,546 to Sarti, include redundant power distribution techniques that avoid the use of traditional UPS architectures.

SUMMARY

Some embodiments of the inventive subject matter provide an uninterruptible power supply (UPS) including an inverter configured to be coupled to a load, a non-current-commutated solid-state bypass switch configured to selectively couple a power source to the load to bypass the inverter and a control circuit configured to control the inverter and the bypass switch. In some embodiments, the bypass switch includes at least one transistor configured to control current to the load. For example, the at least one transistor may include at least one IGBT and/or at least one MOSFET.

In some embodiments, the control circuit may be configured to operate the inverter and the bypass switch to provide a first mode wherein the inverter provides power to the load and second mode wherein the bypass switch provides power to the load, and the control circuit may be configured to operate the bypass switch in the second mode to control a magnitude of a current provided to the load. The second mode may be an increased-efficiency mode.

In some embodiments, the UPS includes a rectifier having an input configured to be coupled to the power source and an output configured to be coupled to an input of the inverter. The bypass switch may be configured to bypass the rectifier and the inverter in the second mode. The control circuit may be configured to transition to the second mode when the power source meets a certain criterion. In some embodiments, the control circuit may be configured to transition to the second mode response to a failure of the rectifier and/or the inverter.

Further embodiments provide a UPS including a converter including a first half-bridge circuit having an input port configured to be coupled to an AC source and an output port coupled to first and second buses and a second half-bridge circuit having an output port configured to be coupled to a load and an input port coupled to the first and second buses. The UPS further includes a control circuit configured to control the converter to provide a first mode wherein the first bridge circuit and the second bridge circuit operate as a rectifier and an inverter, respectively, and a second mode wherein the first and second bridge circuits operate as a pass-through switch from the AC source to the load.

The control circuit may be configured to transition to the second mode responsive to a failure of a component of the converter. The second mode may be an increased-efficiency mode. The control circuit may be configured to operate the converter in the second mode to control a magnitude of a current provided to the load. The control circuit may be configured to transition to the second mode when the power source meets a certain criterion. The control circuit may also be configured to control a capacitance coupled to at least one of the first and second buses.

Some embodiments provide methods of operating a UPS including a converter having a first half-bridge circuit having an input port configured to be coupled to an AC source and an output port coupled to first and second buses and a second half-bridge circuit having an output port configured to be coupled to a load and an input port coupled to the first and second buses. The methods include operating the converter in a first mode wherein the first bridge circuit and the second bridge circuit operate as a rectifier and an inverter, respectively, and operating the converter in a second mode wherein the first and second bridge circuits operate as a pass-through switch from the AC source to the load.

DETAILED DESCRIPTION

Figure 1:
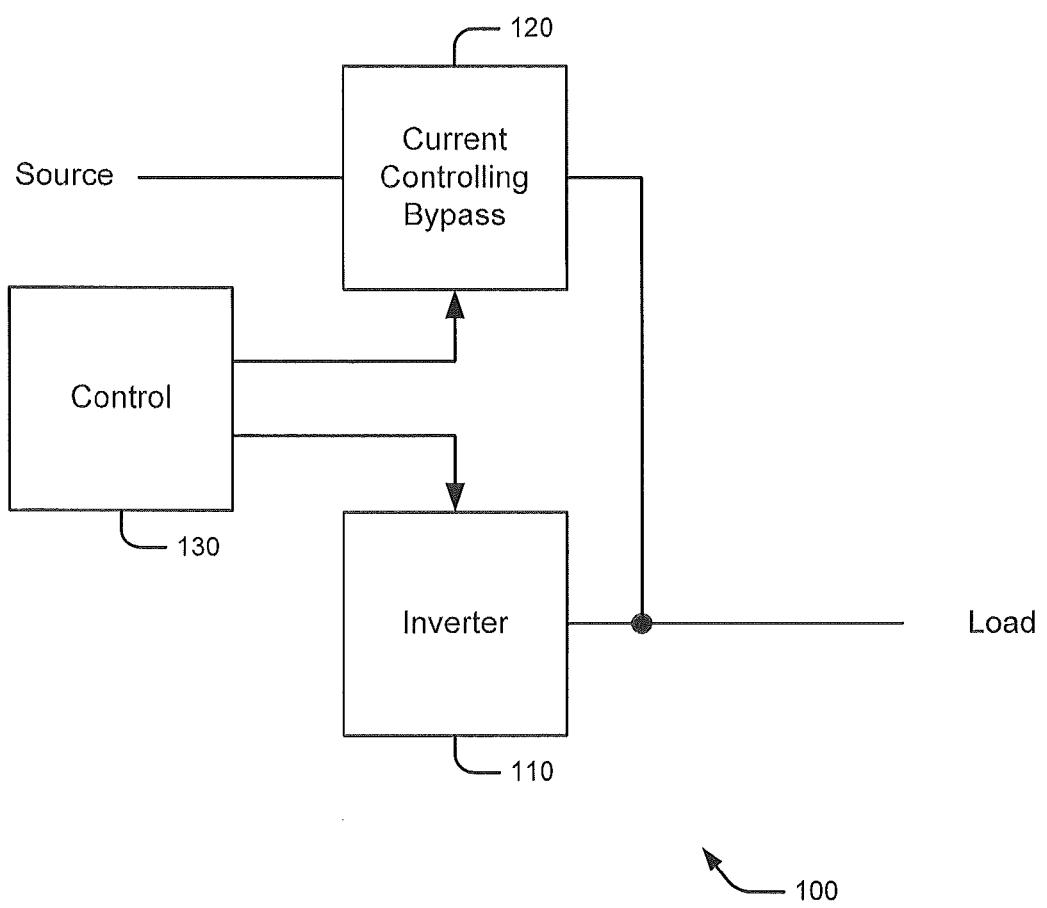
FIG. 1 is a schematic diagram illustrating a UPS system according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from an inventive realization that many UPS applications, it is desirable to have the power conditioning capability afforded by a double-conversion configuration but also to be able to operate a significant amount of the time in a mode that uses a relatively low-loss power transfer path between source and load. Such a power transfer path may also be used to maintain operation in the event that double-conversion circuitry fails. In such modes, it is may also be desirable to have current control and other control capabilities. In some embodiments, such capabilities may be provided by an inventive UPS incorporating a transistorized or other non-current commutated bypass switch that can be used to support a current-controlling bypass operational mode. In further embodiments, such capabilities may be provided by an inventive UPS incorporating a flexible converter structure that can be used to provide a double-conversion mode and a pass-through operating mode that provides current control capabilities.

FIG. 1 illustrates an uninterruptible power supply (UPS) 100 according to some embodiments. The UPS 100 includes an inverter 110, which is configured to be coupled to a load. The UPS 100 may be, for example, an on-line or standby UPS, and the inverter 110 may be configured to provide power to the load from a DC source, such as a battery or a rectifier. The UPS 100 further includes a current modulating bypass switch 120, which is configured to bypass the inverter 110 and provide power to the load from an AC source (e.g., a utility source and/or local generator). A control circuit 130 is configured to control the inverter 110 and the bypass switch 120 to provide at least two modes of operation including a first mode in which the inverter 110 powers the load and second mode in which the bypass switch 120 powers the load. The control circuit 130 is further configured to control the bypass switch 120 in the second mode to modulate (e.g., limit) current provided to the load via the bypass switch 120.

Figure 2:
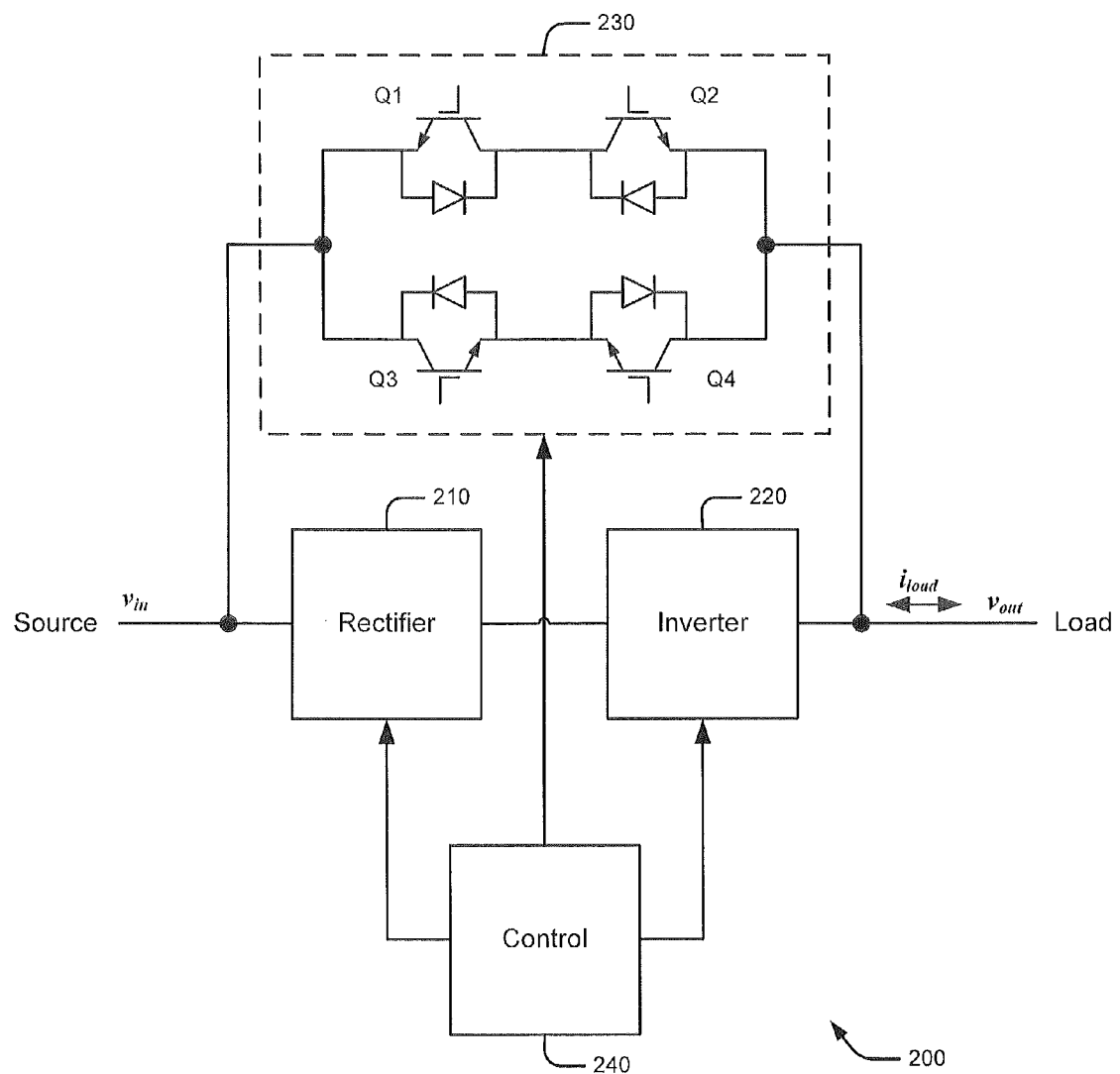
FIG. 2 is a schematic diagram illustrating a UPS system with a transistorized bypass circuit according to some embodiments.

FIG. 2 illustrates an on-line UPS 200 providing such functionality according to further embodiments. The UPS 200 includes a rectifier 210 having an input configured to be coupled to an AC source. An inverter 220 has an input coupled to an output of the rectifier 210 and an output configured to be coupled to a load. The UPS 200 further includes a transistorized bypass circuit 230 (here shown as implemented with insulated gate bipolar transistors (IGBTs) Q1-Q4), which is configured to be coupled between the source and the load.

A control circuit 240 is configured to control the rectifier 210, the inverter 220 and the bypass switch 230 to provide multiple operational modes, including a double-conversion mode in which power is transferred from the source to the load via the rectifier 210 and the inverter 220 and a bypass mode in which power is transferred between the source and the load via the bypass switch 230. The bypass mode may be a used to maintain the load when the rectifier 210 and/or inverter 220 fail and/or to provide increased efficiency operation in comparison to the double-conversion mode. In the bypass mode, the control circuit 240 may also operate the bypass switch 230 to regulate current provided to the load, e.g., by modulating the IGBTs Q1-Q4 of the bypass switch 230.

It will be appreciated that the rectifier 210, inverter 220, bypass switch 230 and control circuit 240 may be implemented using any of a variety of different electronic circuits. For example, the rectifier 210 and inverter 220 may be implemented using power converter circuits comprising IGBTs, power MOSFETs, or other electronic switching devices. Similarly, the bypass circuit 230 may be implemented using various arrangements of switching devices, such as the illustrated IGBT arrangement or functionally similar arrangements of other types of transistors, such as power MOSFETs. The rectifier 210, inverter 220 and bypass switch 230 may be single or multi-phase. The control circuit 240 may include any of a variety of different electronic components, including digital circuits (e.g., a microcontroller or other processor) and analog circuits (e.g., transistor drive circuits).

A transistorized bypass circuit as shown in FIG. 2 offers several potential advantages. Unlike a conventional bypass that uses current-commutated devices, such as silicon-controlled rectifiers (SCRs), such a transistorized switch can be operated nearly instantaneously throughout the AC waveform to provide nearly instantaneous current control. This enables relatively high-bandwidth current limiting to protect against short circuits, overloads and other conditions in which high currents may develop in the bypass path when operating in the bypass mode. Such features may be particular advantageous when using the bypass mode for high-efficiency operation. Using power transistors, such as IGBTs, for bypass switching can also provide advantages in fabrication and paralleling capability in comparison to SCRs and mechanical switches. Because such a transistorized bypass can be integrated into the UPS architecture, sensors and control circuitry can be used to support both double conversion and bypass control regimes.

Figure 3:
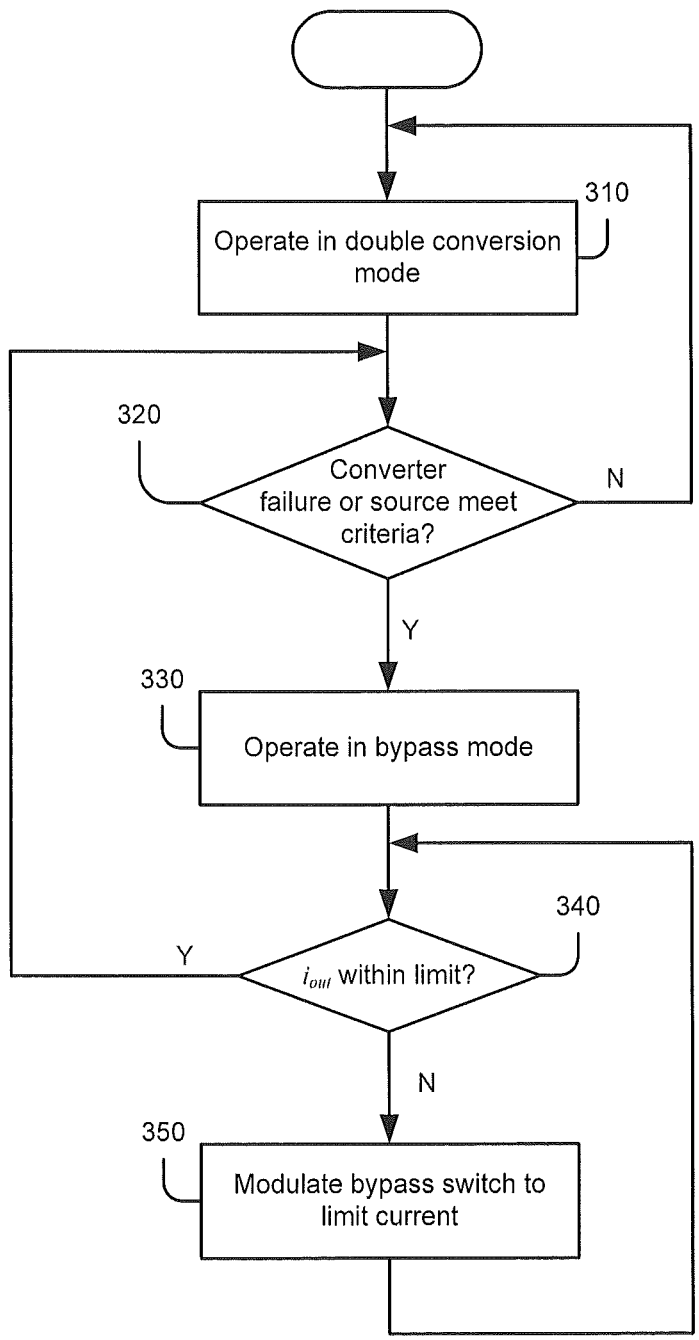
FIG. 3 is a flowchart illustrating operations of the UPS system of FIG. 2 according to some embodiments.

FIG. 3 illustrates exemplary operations of the UPS 200 of FIG. 2 according to some embodiments. At some given point, the UPS 200 is operating in a double-conversion mode to regulate the output produced at the load (block 310). Such a mode of operation may occur upon startup and/or may be dictated by the condition of the source, e.g., if the source fails to meet certain criteria, such as voltage magnitude or waveform criteria. For example, if the waveform of the input voltage $v_{in}$ of the source falls outside of desirable limits, the control circuit 240 may open the bypass switch 230 and operate the rectifier 210 and inverter 220 in double conversion mode to regulate the output voltage $v_{out}$ such that it meets those criteria. Such a condition may occur, for example, when operating under power from a local generator.

When the control circuit 240 detects a failure of the rectifier 210 and/or inverter 220 or when the control circuit 240 detects the source meets certain criteria to allow operation in the bypass mode to provide increased efficiency, the control circuit 240 may close the bypass switch 230 and deactivate the inverter 220, such that power is delivered to the load via the bypass switch 230 (blocks 320, 330). While operating in the bypass mode, the control circuit may monitor the load current $i_{load}$ to detect short circuit or other fault conditions. If the load current $i_{load}$ fails to meet certain criteria, the control circuit 240 may modulate the bypass switch 230 to control (e.g., limit) the current.

Figure 4:
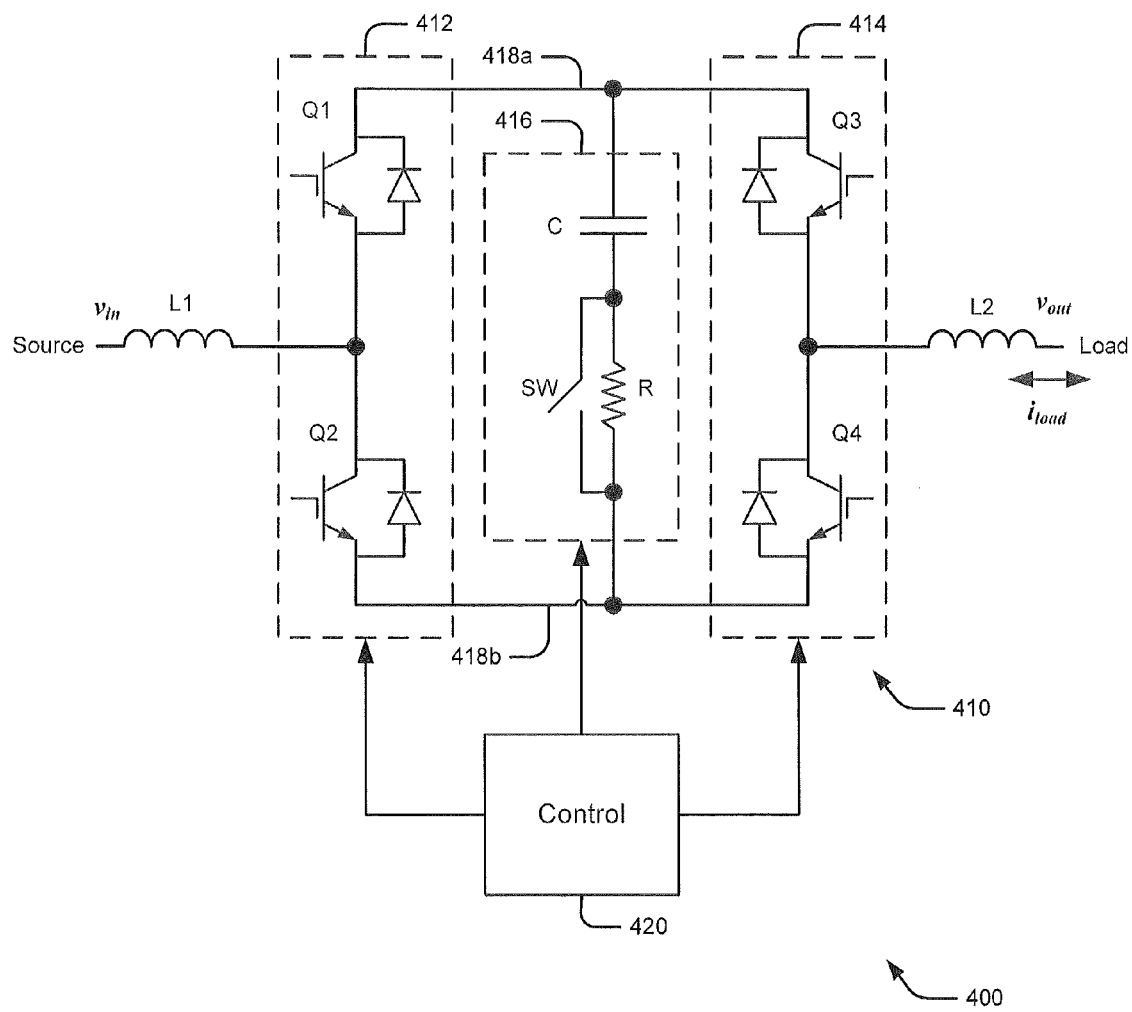
FIG. 4 is a schematic diagram illustrating a UPS system with a dual-mode converter according to some embodiments.

According to further embodiments, a bypass switch may be eliminated in a UPS by using a converter structure that provides both double-conversion and low-loss pass-through modes of operation. Referring to FIG. 4, a UPS 400 according to some embodiments may include a converter 410 including a first half-bridge circuit 412 and a second half-bridge circuit 414 linked by first and second buses 418a, 418b. The first half-bridge circuit 412 includes first and second IGBTs Q1, Q2 coupled between the first and second buses 418a, 418b, and is configured to be coupled to a source by a first inductor L1. The second half-bridge circuit 414 includes third and fourth IGBTs Q3, Q4 coupled between the first and second buses 418a, 418b, and is configured to be coupled to a load via a second inductor L2. An energy storage circuit 416 is coupled to the first and second buses 418a, 418b. A control circuit 420 controls the first half-bridge circuit 412, the second half-bridge circuit 414 and the energy storage circuit 416.

According to some embodiments, the control circuit 420 may control the first half-bridge circuit 412, the second half-bridge circuit 414 and the energy storage circuit 316 to provide multiple operating modes including a double-conversion mode and a pass-through mode. In the double-conversion mode, the control circuit 420 may operate the first half-bridge circuit 412 as a rectifier and the second half-bridge circuit 414 as an inverter. In this mode, for example, the transistors Q1-Q4 of the first and second half-bridge circuits 412, 414 may be pulse-width modulated at a relatively high frequency (e.g., multiple kHz) to provide regulation of a DC voltage produced across the buses 418a, 418b and of an AC voltage $v_{out}$ produced at the load. The control circuit 420 may control the energy storage circuit in this mode to provide a capacitance at the first and second buses 418a, 418b that supports maintenance of the DC voltage on the buses 418a, 418b. For example, as shown, the energy storage circuit 416 may include at least one capacitor C coupled in series with at least one resistor R, and a switch SW configured to selectively bypass the at least one resistor R. In the double-conversion mode, the switch SW may be closed to couple the at least one capacitor C directly between the buses 418a, 418b.

In the pass-through mode, the control circuit 420 may control the transistors Q1-Q4 of the first and second half-bridge circuits 412, 414 to provide lower-loss power transfer between the source and the load while still providing current control. In particular, the control circuit 420 may place the transistors Q1-Q4 of the first and second half-bridge circuits 412, 414 into a substantially static "on" state to provide a relatively low loss path between the source and the load, and such that the voltages on the first and second buses 418a, 418b substantially follow the source voltage $v_{in}$. In this mode, the control circuit 420 opens the switch SW of the energy storage circuit 316 to substantially eliminate the effect of the at least one capacitor C. In this mode, the control circuit 420 may also selectively modulate the transistors Q1-Q4 to provide current limiting and other current control.

In some embodiments, this pass-through mode may be used to provide increased efficiency operation when the source meets certain criteria, e.g., when the source voltage $v_{in}$ is within certain bounds. The pass-through mode may also be used to maintain operation when the converter 410 is unable to maintain double conversion operation due, for example, to component failure that prevents double-conversion operation but still supports pass-through operation. For example, if one of the half-bridge transistors (e.g., Q1) fails, it may still be possible to support pass-through operation using two of the remaining bridge transistors (e.g., Q2 and Q4).

Figure 5:
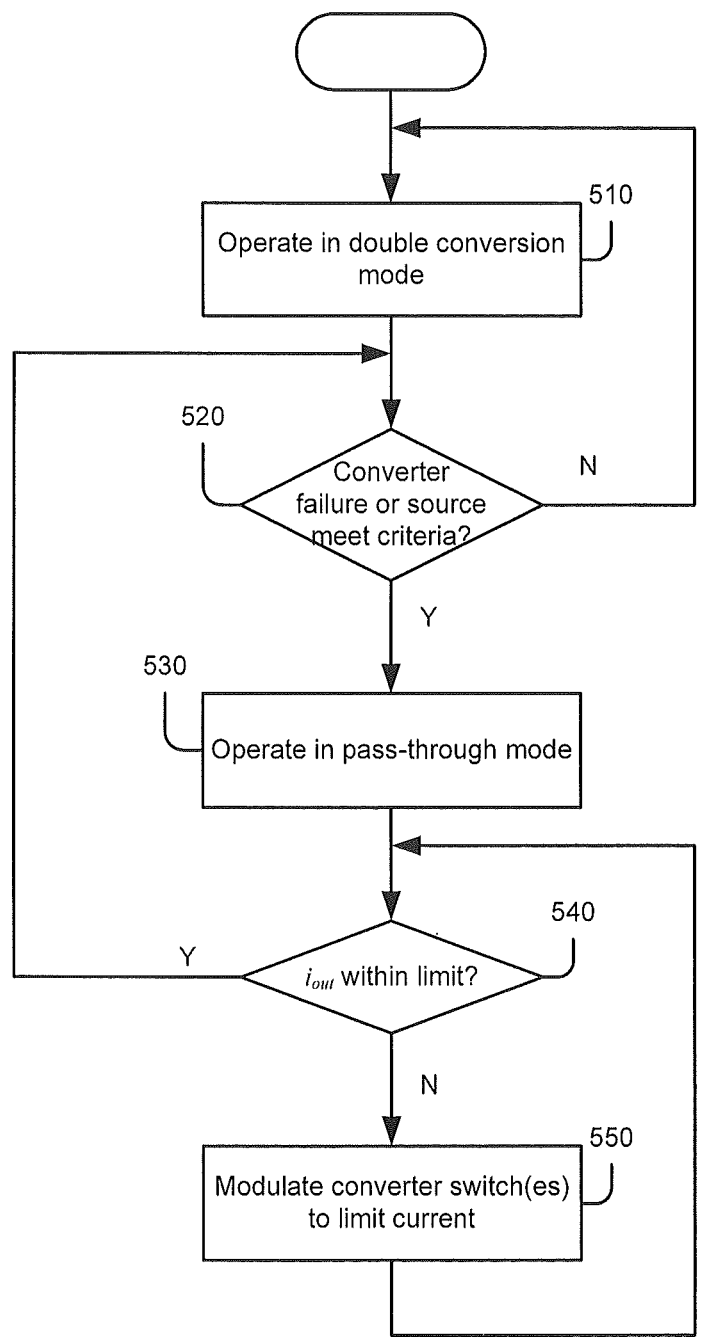
FIG. 5 is a schematic diagram illustrating operations of the UPS system of FIG. 4 according to further embodiments.

FIG. 5 illustrates exemplary operations of the UPS 400 of FIG. 4 according to further embodiments. At some given point, the UPS 400 operates in a double-conversion mode to regulate the output produced at the load (block 510). Such a mode of operation may occur upon startup and/or may be dictated by the condition of the source, e.g., if the source fails to meet certain criteria, such as voltage magnitude or waveform criteria. For example, if the magnitude of the input voltage $v_{in}$ of the source falls outside of desirable limits, the control circuit 420 may operate the first and second half-bridge circuits 412, 414 as a rectifier and inverter, respectively, to regulate the output voltage $v_{out}$ such that it meets those criteria. In this mode, the control circuit 420 controls the energy storage circuit to provide the requisite capacitance to support the DC voltage at the buses 418a, 418b.

When the control circuit 420 detects a failure of the converter 410 or when the control circuit 420 detects that the source meets certain criteria to allow operation in the higher efficiency pass-through mode, the control circuit 420 may transition operation of the first and second half-bridge circuits 412, 414 to a substantially static "on" mode, such that a relatively low loss path is provided between the source and the load (blocks 520, 530). In this mode the control circuit 420 may control the energy storage circuit 416 to reduce the capacitance at the first and second buses 418a, 418b. While operating in the pass-through mode, the control circuit 420 may monitor the load current $i_{load}$ to detect short circuit or other fault conditions. If the load current $i_{load}$ fails to meet certain criteria the control circuit 440 may modulate the transistors Q1-Q4 of the converter 400 to control (e.g., limit) the current.

It will be appreciated that the apparatus and operations described above may be used advantageously for other purposes. For example, the bypass and pass-through modes described above may also be used to support processes such as generator walk-in, e.g., these modes may be used to support high-efficiency or emergency operation when the UPS is operating from a local generator, with the double-conversion modes used to stabilize the output voltage after startup until the generator stabilizes.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An uninterruptible power supply (UPS) comprising:
   an inverter configured to be coupled to a load;
   a non-current-commutated solid-state bypass switch configured to selectively couple a power source to the load to bypass the inverter; and
   a control circuit configured to operate the inverter and the bypass switch to provide a first mode wherein the inverter provides power to the load and a second mode wherein the bypass switch provides power to the load, and wherein the control circuit is configured to modulate the bypass switch in the second mode to control a magnitude of a current provided to the load.

2. The UPS of claim 1, wherein the bypass switch comprises at least one transistor configured to conduct a current to the load.

3. The UPS of claim 2, wherein the at least one transistor comprises at least one IGBT and/or at least one MOSFET.

4. The UPS of claim 3, wherein the bypass switch comprises at least two IGBTs connected to provide opposite polarities.

5. The UPS of claim 1, wherein the second mode comprises an increased-efficiency mode.

6. The UPS of claim 1, further comprising a rectifier having an input configured to be coupled to the power source and an output configured to be coupled to an input of the inverter, wherein the bypass switch is configured to bypass the rectifier and the inverter in the second mode and wherein the control circuit is configured to transition to the second mode when the power source meets a certain criterion.

7. The UPS of claim 1, wherein the control circuit is configured to transition to the second mode responsive to a failure of the rectifier and/or the inverter.

8. A UPS comprising:
   a converter comprising a first half-bridge circuit having an input port configured to be coupled to an AC source and an output port coupled to first and second buses and a second half-bridge circuit having an output port configured to be coupled to a load and an input port coupled to the first and second buses; and
   a control circuit configured to control the converter to provide a first mode wherein the first bridge circuit and the second bridge circuit operate as a rectifier and an inverter, respectively, and a second mode wherein the first and second bridge circuits operate as a pass-through switch from the AC source to the load.

9. The UPS of claim 8, wherein the control circuit is configured to transition to the second mode responsive to a failure of a component of the converter.

10. The UPS of claim 8, wherein the second mode comprises an increased-efficiency mode.

11. The UPS of claim 8, wherein the control circuit is configured to operate the converter in the second mode to control a magnitude of a current provided to the load.

12. The UPS of claim 8, wherein the control circuit is configured to transition to the second mode when the power source meets a certain criterion.

13. The UPS of claim 8, wherein the control circuit is configured to control a capacitance coupled to at least one of the first and second buses.

14. The UPS of claim 13, further comprising a capacitor and a resistor coupled in series between the first and second buses and a switch configured to bypass the resistor, and wherein the control circuit is configured to control the switch.

15. A method of operating a UPS comprising a converter comprising a first half-bridge circuit having an input port configured to be coupled to an AC source and an output port coupled to first and second buses and a second half-bridge circuit having an output port configured to be coupled to a load and an input port coupled to the first and second buses, the method comprising:
   operating the converter in a first mode wherein the first bridge circuit and the second bridge circuit operate as a rectifier and an inverter, respectively; and
   operating the converter in a second mode wherein the first and second bridge circuits operate as a pass-through switch from the AC source to the load.

16. The method of claim 15, comprising transitioning to the second mode responsive to a failure of a component of the converter.

17. The method of claim 15, wherein the second mode comprises an increased-efficiency mode.

18. The method of claim 15, comprising operating the converter in the second mode to control a magnitude of a current provided to the load.

19. The method of claim 15, comprising transitioning to the second mode when the power source meets a certain criterion.

20. The method of claim 15, comprising controlling a capacitance coupled to at least one of the first and second buses.

* * * * *